(12) United States Patent
Boddy et al.

(10) Patent No.: US 7,874,687 B1
(45) Date of Patent: Jan. 25, 2011

(54) MULTI-FUNCTION SIDE DETENT FOR VEHICULAR MIRROR

(75) Inventors: Ian Boddy, Ada, MI (US); Rex E. Blakeman, Michigan Center, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 945 days.

(21) Appl. No.: 11/306,086

(22) Filed: Dec. 15, 2005

Related U.S. Application Data

(60) Provisional application No. 60/593,143, filed on Dec. 15, 2004.

(51) Int. Cl.
*G02B 5/08* (2006.01)

(52) U.S. Cl. .................. 359/841; 359/871; 248/478

(58) Field of Classification Search ............. 359/841, 359/478, 479, 871; 248/478, 479
See application file for complete search history.

(56) References Cited

U.S. PATENT DOCUMENTS

| | | | |
|---|---|---|---|
| 2,856,816 A | 10/1958 | Ross | |
| 2,903,210 A | 9/1959 | Cousins | |
| 3,189,309 A | 6/1965 | Hager | |
| 3,282,549 A | 11/1966 | Crawford | |
| 3,667,718 A | 6/1972 | Goslin et al. | |
| 4,165,156 A | 8/1979 | O'Connell | |
| 4,258,894 A | 3/1981 | Niggemann | |
| 4,315,614 A | 2/1982 | Stegenga et al. | |
| 4,558,930 A | 12/1985 | Deedreek | |
| 4,598,982 A | 7/1986 | Levine | |
| 4,605,289 A | 8/1986 | Levine et al. | |
| 4,711,538 A | 12/1987 | Ohs et al. | |
| 4,753,410 A | 6/1988 | Dyer | |
| 4,789,232 A * | 12/1988 | Urbanek ............ 248/549 |
| 4,892,400 A | 1/1990 | Brookes et al. | |
| 4,892,401 A | 1/1990 | Kittridge et al. | |
| 4,921,337 A | 5/1990 | Hou | |
| 5,007,724 A | 4/1991 | Hou | |
| 5,096,283 A | 3/1992 | Croteau | |
| 5,110,196 A | 5/1992 | Lang et al. | |
| 5,124,847 A | 6/1992 | Gong | |
| 5,210,655 A | 5/1993 | Mishali | |
| 5,225,943 A | 7/1993 | Lupo | |

(Continued)

*Primary Examiner*—Stephone B Allen
*Assistant Examiner*—Jennifer L. Doak
(74) *Attorney, Agent, or Firm*—McGarry Bair PC

(57) ABSTRACT

A vehicular exterior mirror assembly comprises a base assembly adapted for fixed attachment to an exterior portion of the vehicle and a reflective element assembly pivotally attached to the base assembly and supported thereby. A pivot member having a perimeter wall is interposed between the base assembly and the reflective element assembly and defines an axis of rotation between the base assembly and the reflective element assembly. A side-acting detent assembly is mounted to one of the base assembly and the reflective element assembly, and has a side-acting detent assembly member positioned to exert a force against the perimeter wall of the pivot member normal to the axis of rotation. One of the pivot member and the side-acting detent assembly member comprises at least one indentation and the other of the pivot member and the side-acting detent assembly member comprises a bearing element. The reflective element assembly can be pivoted relative to the base assembly against the force exerted by the side-acting detent assembly member and, when the bearing element engages with the at least one indentation, the reflective element assembly will be held in a position defined by the at least one indentation relative to the base assembly by said force.

19 Claims, 20 Drawing Sheets

U.S. PATENT DOCUMENTS

| | | |
|---|---|---|
| 5,337,190 A | 8/1994 | Kogita et al. |
| 5,375,014 A | 12/1994 | Fujie et al. |
| 5,546,239 A | 8/1996 | Lewis |
| 5,604,644 A | 2/1997 | Lang et al. |
| 5,623,374 A * | 4/1997 | Montanbault ............... 359/841 |
| 5,639,054 A * | 6/1997 | Gerndt et al. ............... 248/478 |
| 5,969,890 A | 10/1999 | Whitehead |
| 6,024,459 A | 2/2000 | Lewis |
| 6,439,730 B1 * | 8/2002 | Foote et al. ................. 359/877 |
| 6,505,944 B1 | 1/2003 | Lewis |
| 6,648,481 B2 | 11/2003 | Lewis |
| 6,820,987 B1 | 11/2004 | Lewis |
| 6,939,017 B2 | 9/2005 | Lewis |
| 2005/0030652 A1 | 2/2005 | Lewis |

* cited by examiner

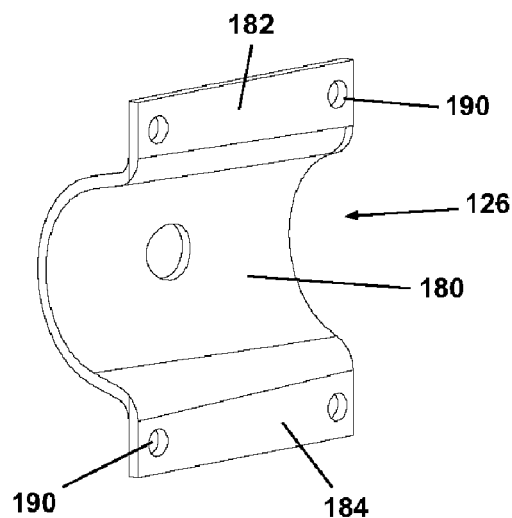
Fig. 10
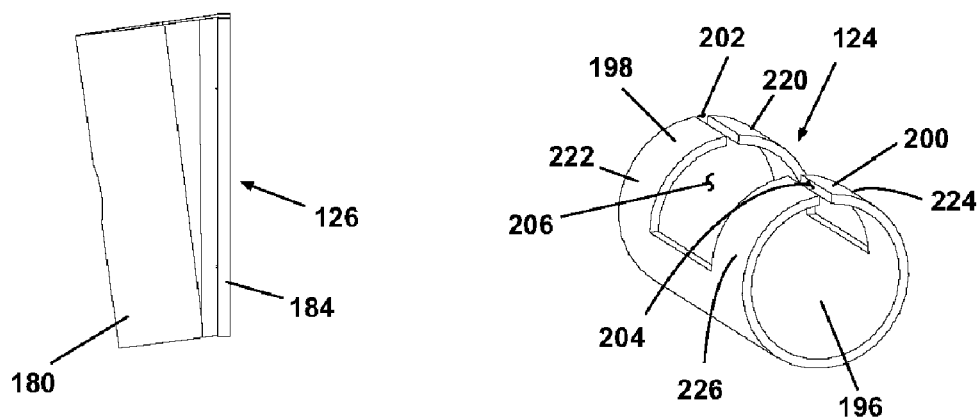
Fig. 11                                Fig. 12

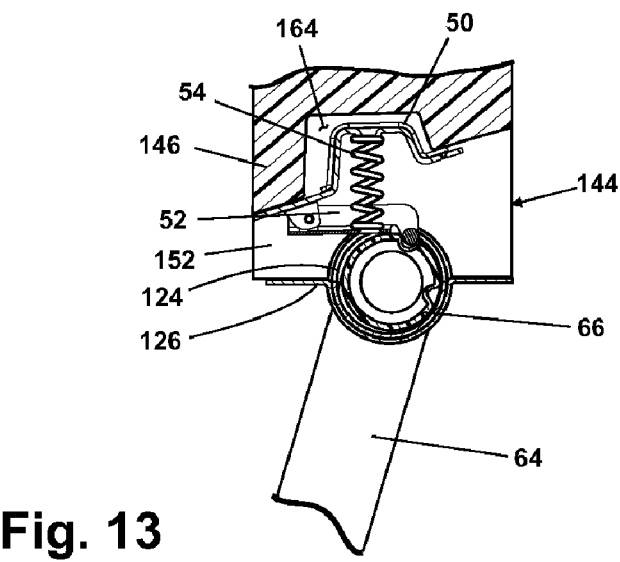
Fig. 13
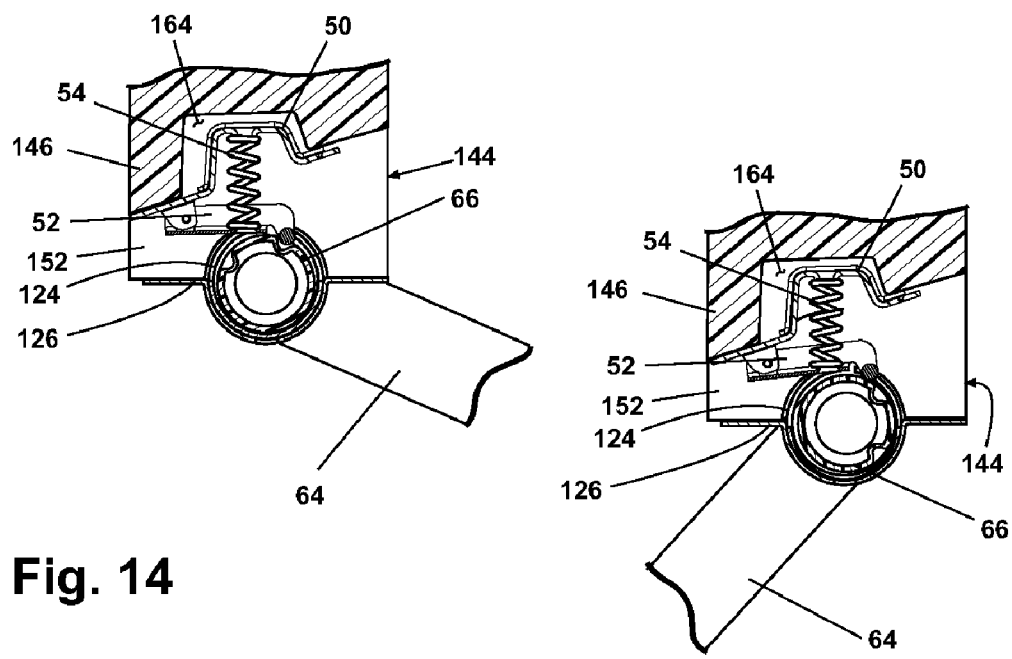
Fig. 14
Fig. 15

MULTI-FUNCTION SIDE DETENT FOR VEHICULAR MIRROR

CROSS-REFERENCE TO RELATED APPLICATION

This application claims the benefit of U.S. provisional application Ser. No. 60/593,143, filed Dec. 15, 2004, which is incorporated herein in its entirety.

FIELD OF THE INVENTION

The invention relates generally to a rearview mirror system for a motor vehicle and more particularly to a detent assembly for a rearview mirror system which can be interchangeably incorporated into selected moving parts to control the movement and positioning of the moving parts.

DESCRIPTION OF THE RELATED ART

Motor vehicles typically include at least one external rearview mirror system for providing the operator with a rearward view. The mirror system typically includes a base for mounting the assembly to the vehicle, a reflective element assembly for providing the rearward view, and an arm assembly connecting the reflective element assembly to the base. It is well known to configure the arm assembly to enable the reflective element assembly to be selectively extended outwardly of the vehicle to provide an enhanced rearward view, such as when a trailer is being towed. It is also well known to configure the connection of the arm assembly to the base to provide for pivotal movement of the arm assembly relative to the base to enable folding of the mirror system against the vehicle. An example of an extendable, foldable external rearview mirror is disclosed in U.S. Pat. No. 6,439,730 to Foote et al., which is incorporated herein in its entirety. The mirror system can also incorporate other movable parts which can be selectively moved and positioned among two or more configurations.

Various mechanisms have been developed for enabling the movable parts of a mirror system to be selectively moved to different positions and securely retained in a selected position, while preventing the movable parts from moving out of a selected position during normal operation. Such mechanisms are typically incorporated into specific moving parts and are usable only for such parts. Thus, for each set of moving parts in the mirror system, a separate mechanism must be designed, fabricated, and assembled into the mirror system. The need for separate mechanisms increases the cost of fabricating the mirror system in that additional materials, workmanship, and manufacturing steps are necessary.

Foldable rearview mirrors typically include a detent assembly incorporated into the pivot assembly connecting the arm assembly to the base. The detent assembly requires that the arm assembly be urged into slidable contact with the base. A helical spring coaxial with the pivot axis is typically used to urge the arm assembly against the base. This helical spring must be properly compressed during installation of the arm assembly to the base, which can be difficult and increases the complexity of the assembly process. Moreover, during operation, vertical shock experienced by the moving vehicle can be transferred to the pivot assembly, which can be severe enough to affect the compression provided by the spring, contributing to uncontrolled vibration and positioning of the reflective element assembly.

SUMMARY OF THE INVENTION

A vehicular exterior mirror assembly comprises a base assembly adapted for fixed attachment to an exterior portion of the vehicle and a reflective element assembly pivotally attached to the base assembly and supported thereby. A pivot member having a perimeter wall is interposed between the base assembly and the reflective element assembly and defines an axis of rotation between the base assembly and the reflective element assembly. A side-acting detent assembly is mounted to one of the base assembly and the reflective element assembly, and has a side-acting detent assembly member positioned to exert a force against the perimeter wall of the pivot member normal to the axis of rotation. One of the pivot member and the side-acting detent assembly member comprises at least one indentation and the other of the pivot member and the side-acting detent assembly member comprises a bearing element. The reflective element assembly can be pivoted relative to the base assembly against the force exerted by the side-acting detent assembly member and, when the bearing element engages with the at least one indentation, the reflective element assembly will be held in a position defined by the at least one indentation relative to the base assembly by said force.

BRIEF DESCRIPTION OF THE DRAWINGS

FIG. 10 is a perspective view of a detent clamp comprising a portion of the detent assembly illustrated in FIG. 8.

FIG. 11 is a side view of the detent clamp illustrated in FIG. 10.

FIG. 12 is a perspective view of a detent liner comprising a portion of the detent assembly illustrated in FIG. 8.

FIG. 13 is a sectional view of the pivot connection and the detent assembly taken along view line 13-13 of FIG. 1 illustrating the detent assembly with the mirror system in a fully unfolded position.

FIG. 14 is a sectional view of the pivot connection and the detent assembly taken along view line 13-13 of FIG. 1 illustrating the detent assembly with the mirror system in a fully folded position.

FIG. 15 is a sectional view of the pivot connection and the detent assembly taken along view line 13-13 of FIG. 1 illustrating the detent assembly with the mirror system in an overtravel position.

DESCRIPTION OF THE PREFERRED EMBODIMENT

Figure 1:
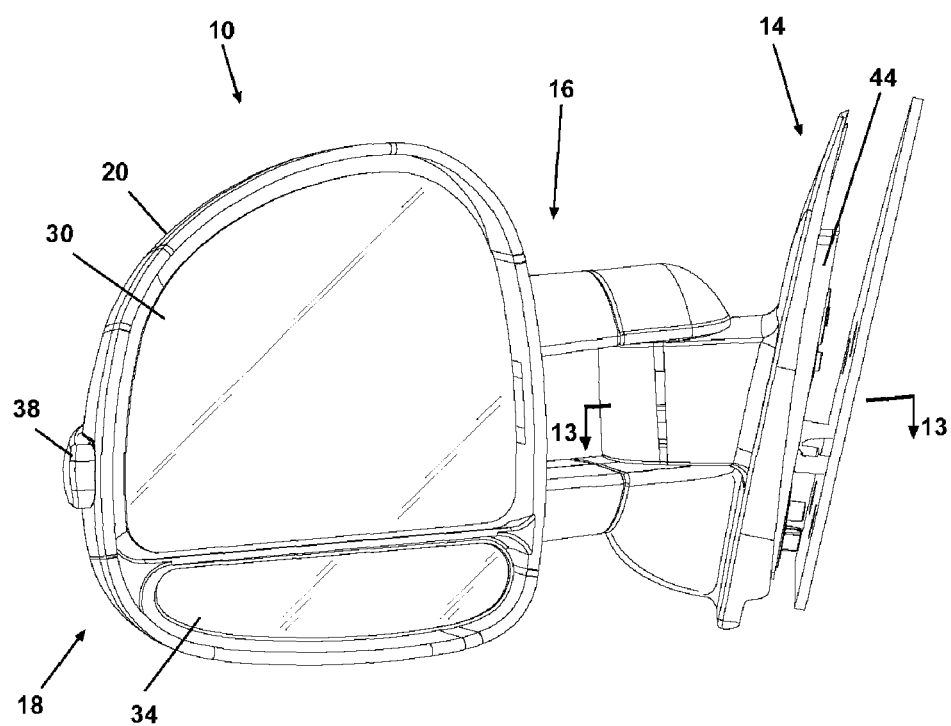
FIG. 1 is a perspective view of a vehicle rearview mirror system according to the invention.
Figure 2:
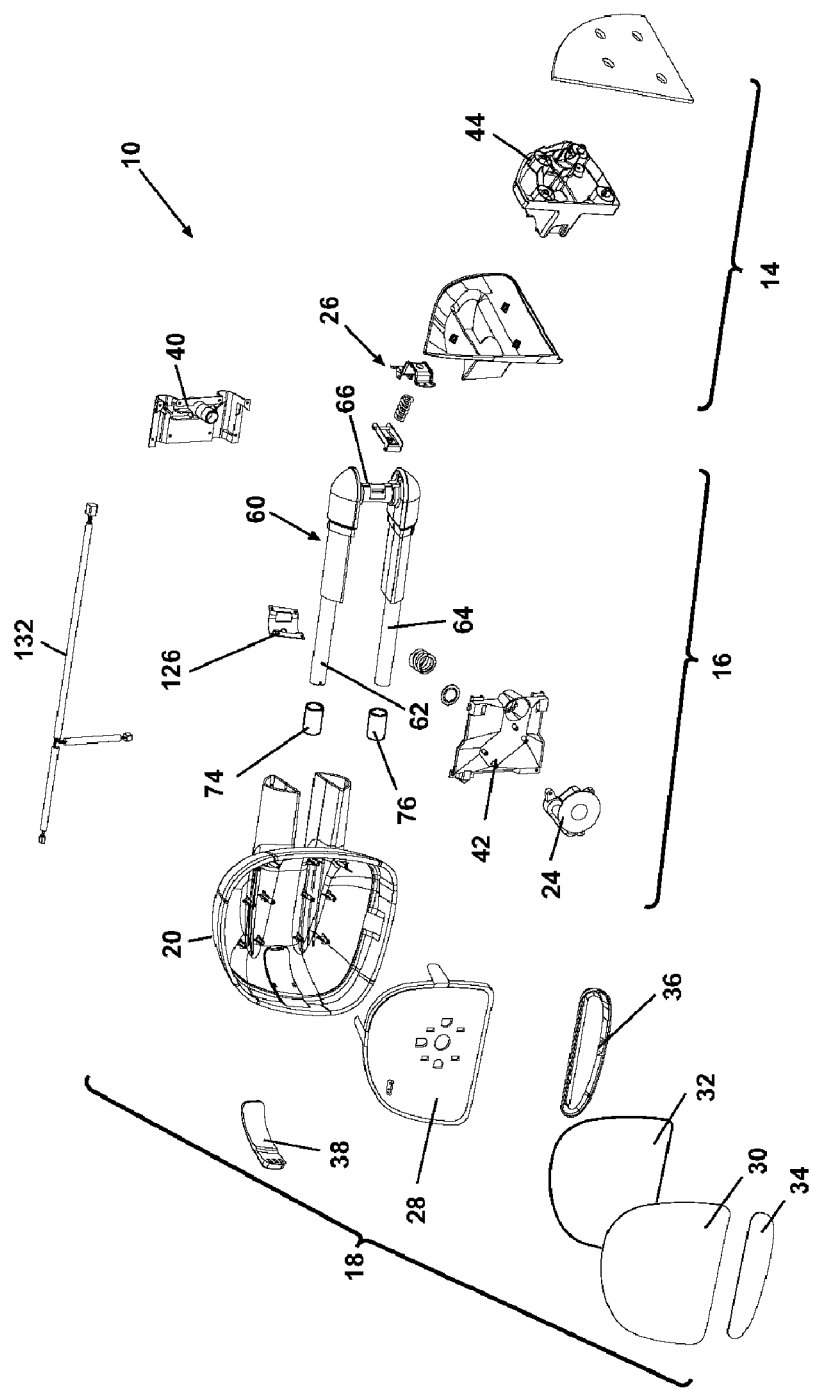
FIG. 2 is an exploded view of the rearview mirror system illustrated in FIG. 1.
Figure 3:
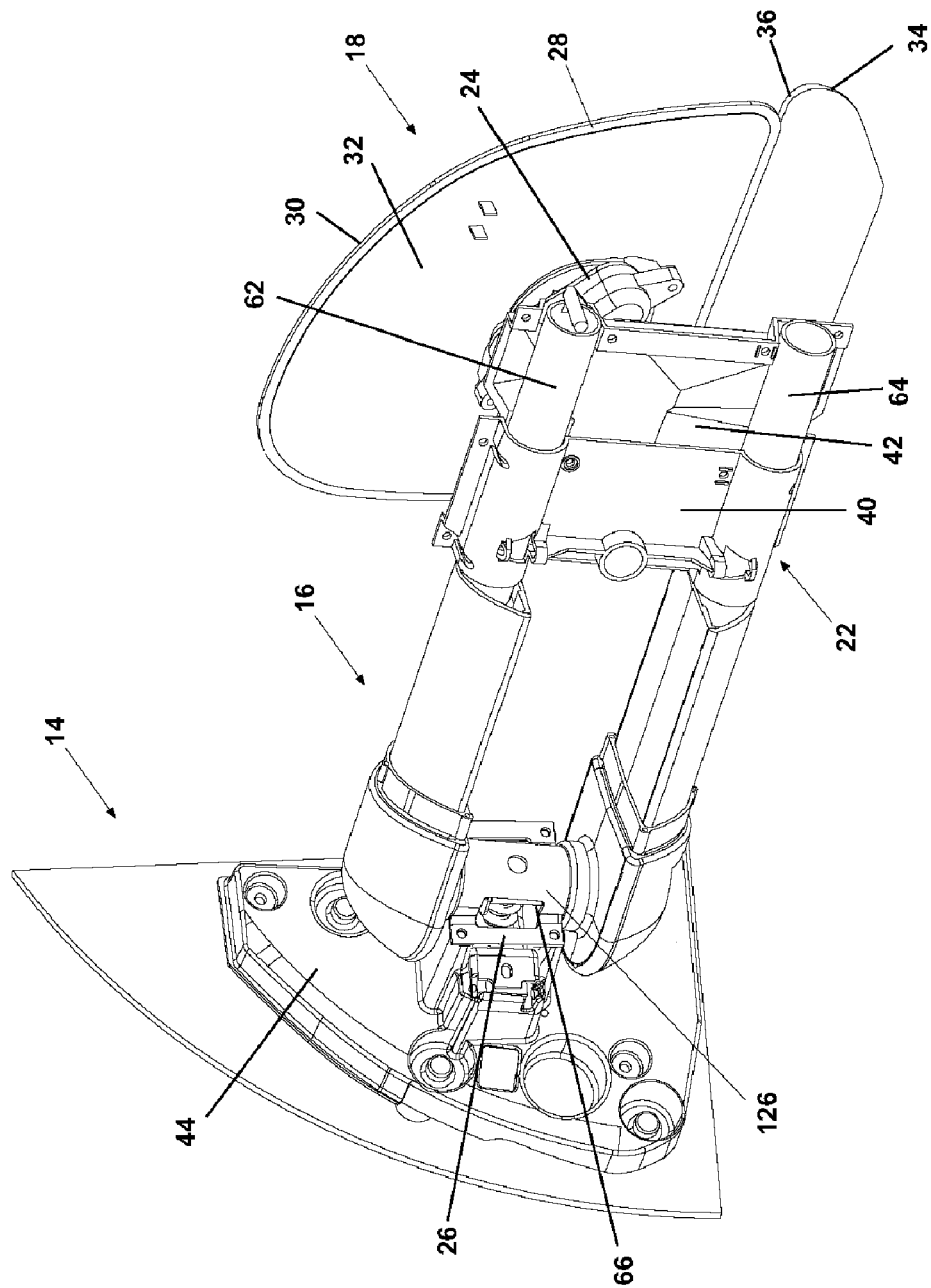
FIG. 3 is a perspective view of the rearview mirror system illustrated in FIG. 1 with a mirror system housing removed for convenience to show the interior of the mirror system comprising a detent assembly according to the invention, a pivot connection, and a dual-arm assembly.

Referring to the Figures, and in particular to FIG. 1, a vehicle mirror system 10 according to the invention is adapted for attachment to the exterior of a motor vehicle (not shown). Referring also to FIGS. 2 and 3, the vehicle mirror system 10 comprises a base assembly 14 adapted for fixed mounting to the motor vehicle, an arm assembly 16 pivotably attached to the base assembly 14 and comprising a first embodiment of a detent assembly 26 according to the invention, and supporting a reflective element assembly 18 for providing the operator of the motor vehicle with a reflective rearward view. An example of such a mirror system is described in U.S. Pat. No. 6,439,730 to Foote et al., which is incorporated herein in its entirety.

The reflective element assembly 18 can share several elements of a well-known vehicle rearview mirror system, including a tilt actuator 24, a bezel (not shown), a reflective element mounting panel 28, a reflective element 30, a heating element 32, a spotter element 34, and a spotter element mounting panel 36. The reflective element assembly 18 is also illustrated comprising a generally conventional shell 20 housing the aforementioned elements 24-36, an optional turn signal assembly 38, and a shell bracket assembly 22. A well-known wire harness 132 is also provided for supplying power to the tilt actuator 24, the heating element 32, the turn signal assembly 38, and other electric powered elements, such as an electrochromic dimming element, a powerextend actuator, and the like.

An embodiment of the invention is described and illustrated herein as part of a manual fold mechanism for a mirror system 10 comprising a well-known dual arm assembly. The invention can alternatively be incorporated into other mirror assemblies such as a single arm mirror system, a power-fold mirror system, a power-extend mirror system, a mirror system having a reflective element assembly pivotable laterally about a horizontal axis, and the like. The invention can also be used for the control of movement and positioning of other movable parts in a mirror system.

Figure 4:
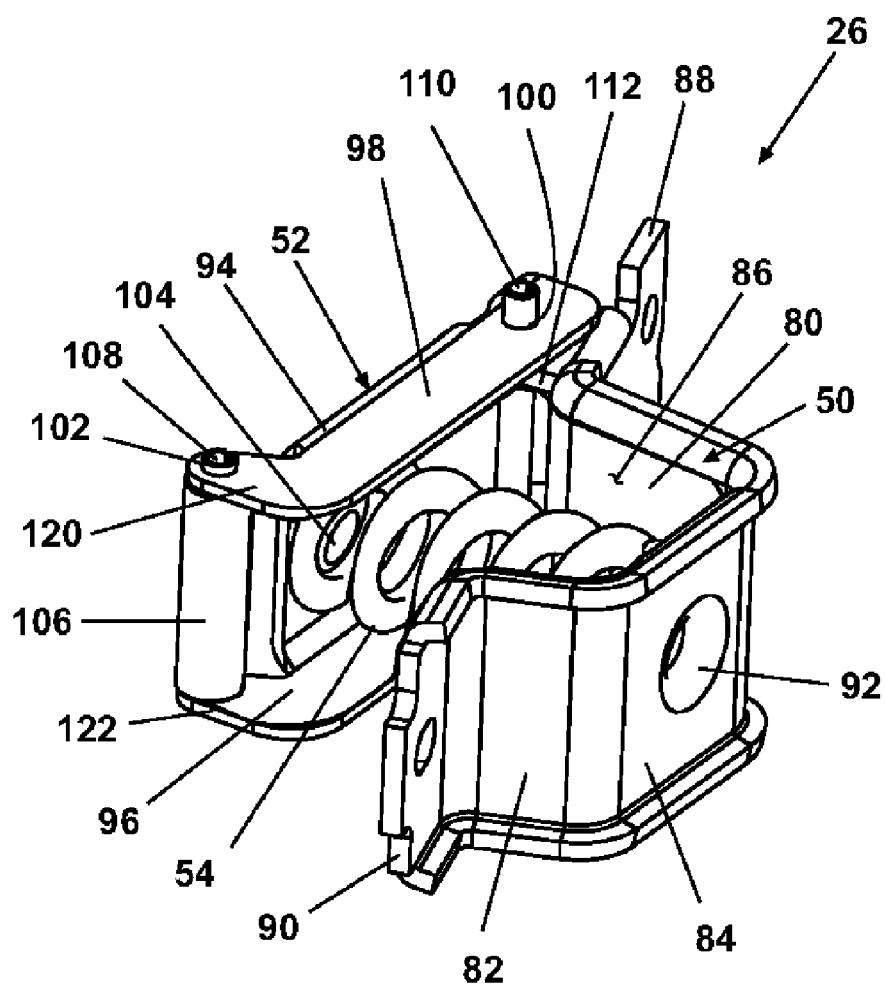
FIG. 4 is a perspective view of the detent assembly illustrated in FIG. 3.
Figure 5:
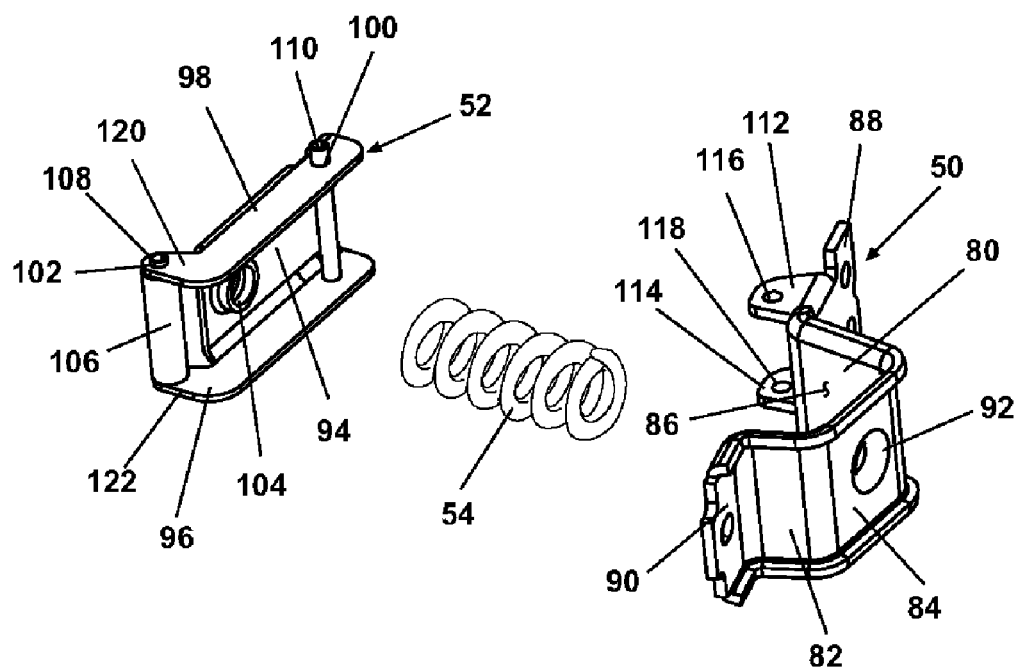
FIG. 5 is an exploded view of the detent assembly illustrated in FIG. 4.

Referring now to FIGS. 4 and 5, the detent assembly 26 comprises a support element 50, a pivot element 52, and a helical spring 54. The support element 50 is a generally rectilinear, strap-like member comprising a first side wall 80, a second side wall 82 in spaced-apart relationship, and a bearing wall 84 joining the side walls 80, 82 to form a generally U-shaped structure defining a spring pocket 86. Extending away from the first side wall 80 is a mounting flange 88. Extending away from the second side wall 82 is a mounting flange 90. Extending into the spring pocket 86 is a rounded boss-like spring retainer 92. Extending orthogonally away from the mounting flange 88 opposite the spring pocket 86 are a pair of spaced-apart, parallel pin flanges 112, 114 having a pair of coaxially aligned pin apertures 116, 118 extending therethrough.

The pivot element 52 is a generally rectilinear, box-like body comprising a bearing wall 94, and a pair of side walls 96, 98 extending longitudinally therealong and orthogonally therefrom in parallel, spaced-apart relationship. Each side wall 96, 98 is generally L-shaped, having a pin arm 120, 122, respectively, extending laterally therefrom at a first end thereof. Each pin arm 120, 122 has a pin aperture 102 extending therethrough in coaxial alignment. Each side wall 96, 98 has a pin aperture 100 extending therethrough at a second end thereof in coaxial alignment. The bearing wall 94 is provided with a rounded boss-like spring retainer 104 extending between the side walls 96, 98. An elongated detent bearing element, such as a cylindrical roller 106 is interposed between the pin arms 120, 122. With a detent bearing element comprising the roller 106, a pin 108 extends longitudinally through the pin apertures 102 and the roller 106 to attach the roller 106 to the pin arms 120, 122.

The pivot element 52 is pivotally attached to the support element 50 by a pin 110 extending through the pin apertures 116, 118 of the pin flanges 112, 114, respectively, and the pin apertures 100 of the side walls 96, 98. Preferably, the pin 110 comprises a shock absorbing pin adapted to distribute radially-directed compression forces equally across the pin section, such as a coiled spring pin manufactured by Spirol International Corporation of Danielson, Conn. Other pins can include solid pins, slotted spring pins, and the like. The spring 54 is held between the support element 50 and the pivot element 52 by the spring retainers 92, 104 extending coaxially into the ends of the spring 54 so that the spring 54 bears against the bearing wall 84 to exert a biasing spring force against the bearing wall 94. The spring 54 can be configured with a selected spring constant in order to provide a preferred biasing force to the pivot element 52.

Figure 6:
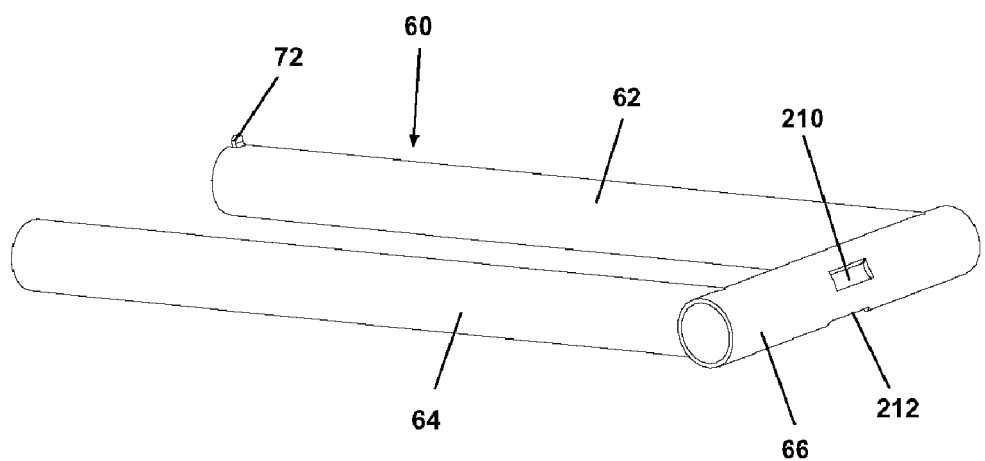
FIG. 6 is a perspective view of a tube assembly comprising a portion of the rearview mirror system illustrated in FIG. 1.

Referring now to FIGS. 2, 3, and 6, a tube assembly 60 is an elongated tubular framework comprising an upper tube 62 and a lower tube 64 in parallel, spaced-apart juxtaposition and adapted for slidable insertion into the shell 20 for extension and retraction of the reflective element assembly 18 relative to the base assembly 14. The upper tube 62 and the lower tube 64 are rigidly attached to a pivot tube 66, having a perimeter wall, in generally orthogonal conformance to form a rectilinear, generally U-shaped frame 60. Preferably, the tube assembly 60 comprises a light-weight steel or aluminum having a sufficient size and strength for the purposes described herein. The upper tube 62 is provided at a free end thereof with an upper tube boss 72 extending radially outwardly therefrom, which functions as a travel stop for the reflective element assembly 18. The pivot tube 66 is provided with a pair of elongated indentations 210, 212 extending radially inwardly into or through the perimeter wall of the pivot tube 66. The longitudinal axes of the indentations 210, 212 are parallel to the longitudinal axis of the pivot tube 66. When the assembly described herein is used in a manual fold mode or during manual overriding of a powerfold mechanism, at least one of the indentations 210, 212 can act as a positioning stop by receiving the roller 106 therein as hereinafter described. An upper arm cover 82 and a lower arm cover 86 enclose the upper tube 62 and the lower tube 64.

Figure 7:
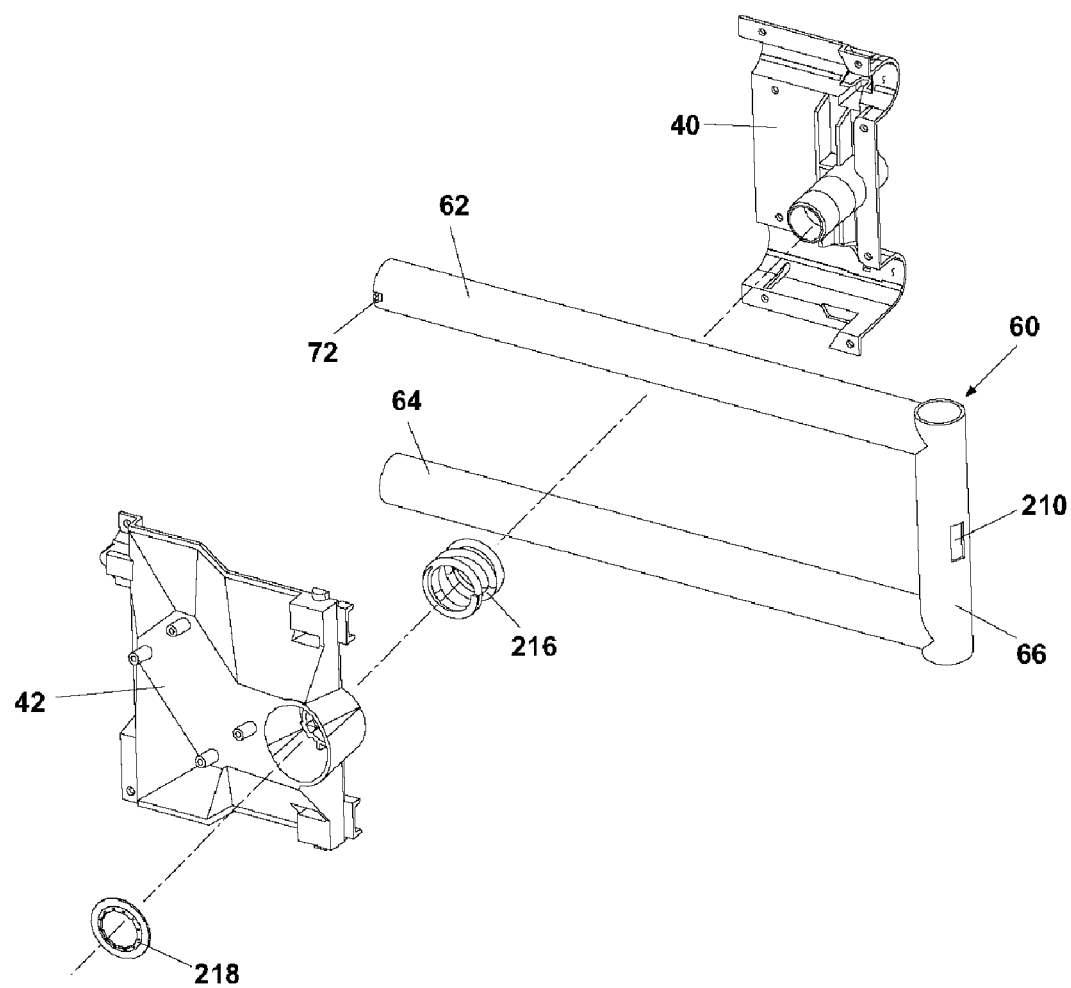
FIG. 7 is an exploded view showing the assembly of a dual-arm bracket assembly to a tube assembly comprising a portion of the rearview mirror system illustrated in FIG. 1.

Referring now to FIG. 7, the shell bracket assembly 22 comprises a lower shell bracket 40 and an upper shell bracket 42. The lower shell bracket 40 and the upper shell bracket 42 are irregularly-shaped, generally flattened bodies adapted to span the distance between the upper tube 62 and the lower tube 64 for slidable translation therealong. The shell brackets 40, 42 are joined together with a spring 216 and a palnut 218, and define upper and lower tube channels which are adapted for slidable communication with the tubes 62, 64. The upper tube 62 and the lower tube 64 will be frictionally held between the lower shell bracket 40 and the upper shell bracket 42. The shell bracket assembly 22 is also adapted to support the tilt actuator 24. Other shell bracket assemblies can be utilized depending on the size and configuration of the mirror assembly.

Figure 8:
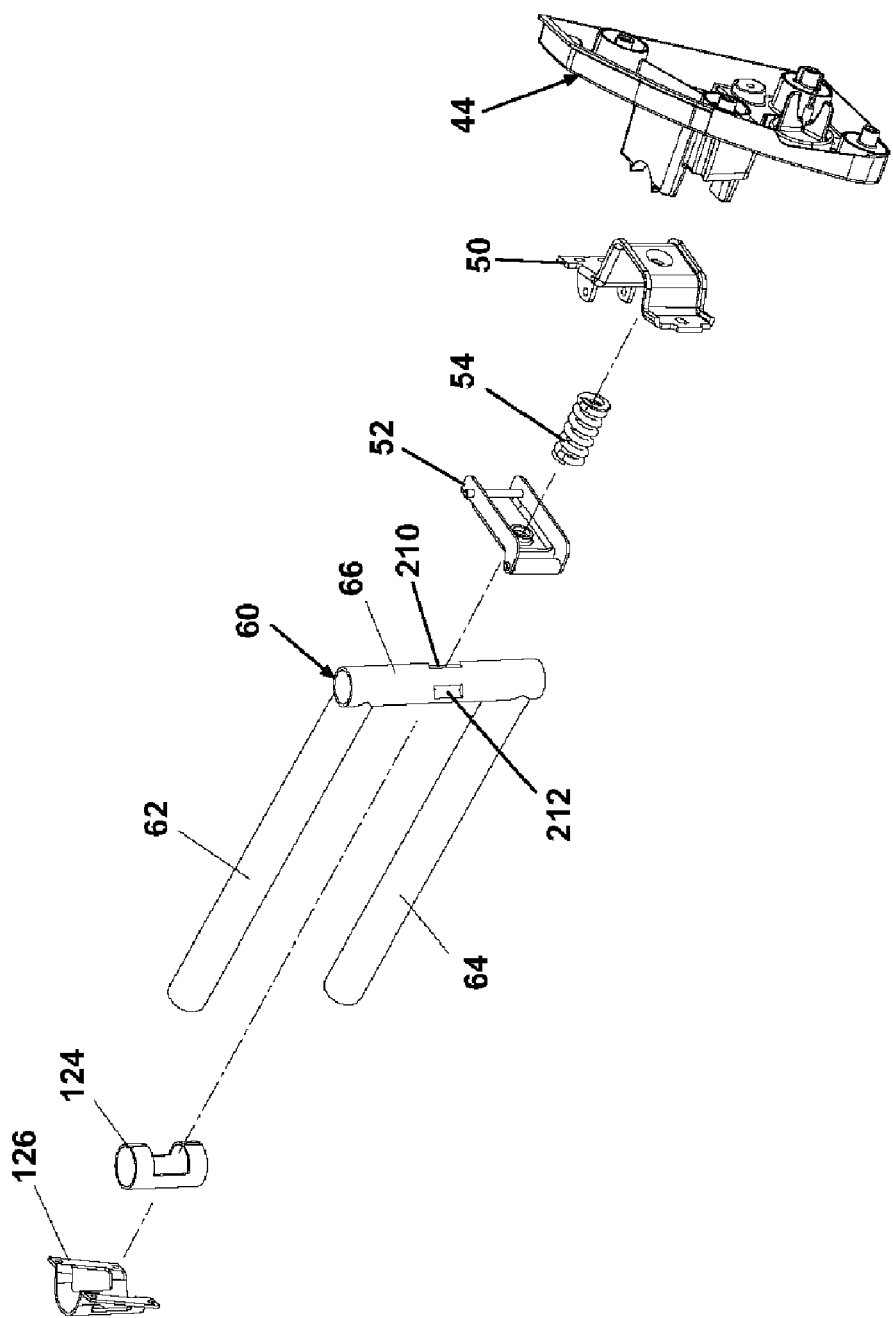
FIG. 8 is an exploded view of the tube assembly and a base comprising a portion of the rearview mirror system illustrated in FIG. 1 showing the attachment of the tube assembly to the base through a detent assembly.
Figure 9:
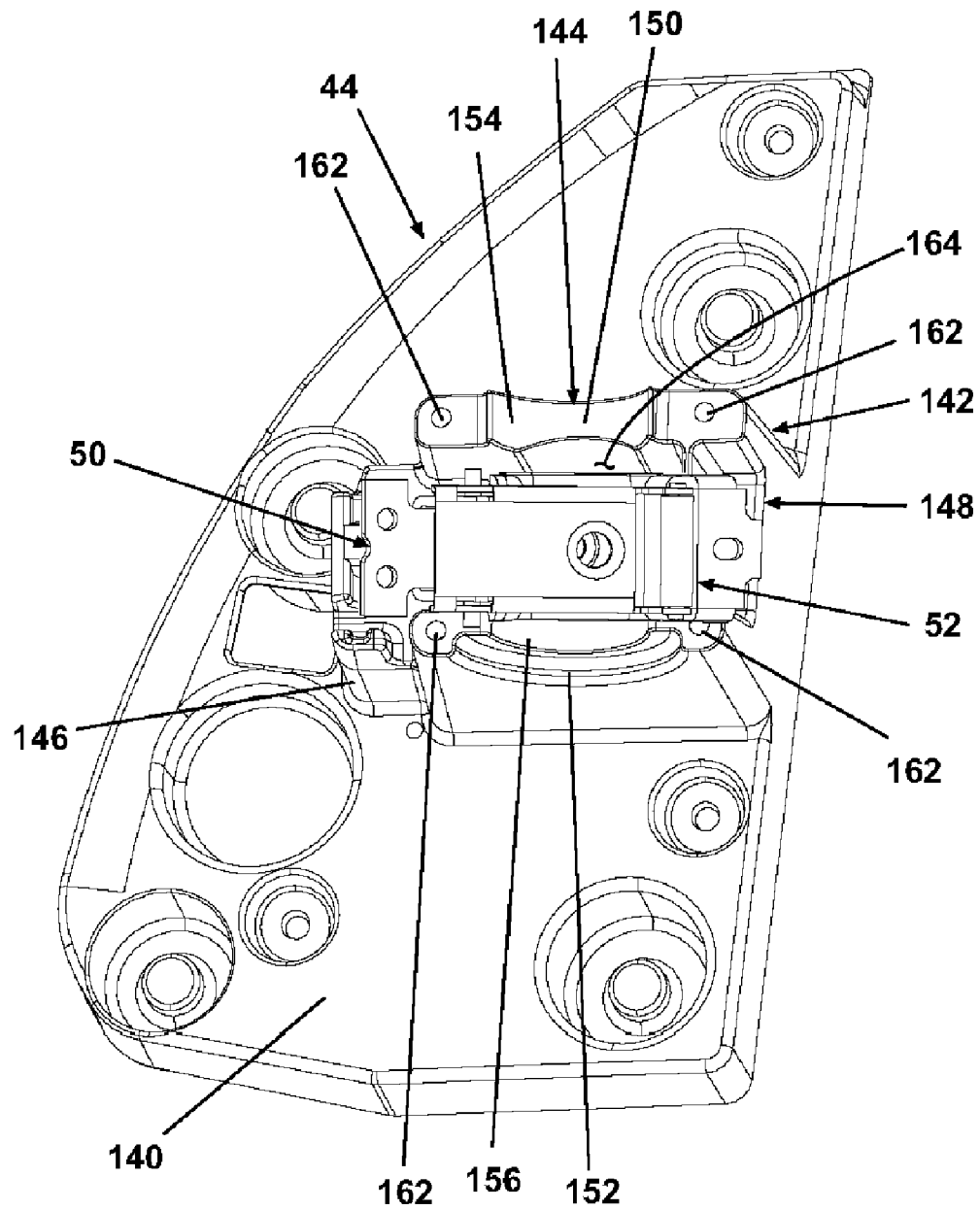
FIG. 9 is a perspective view of the base and detent assembly illustrated in FIG. 8.

As illustrated in FIGS. 8 and 9, the base assembly 14 comprises a base frame 44. The base frame 44 is an irregularly-shaped body comprising a generally triangular-shaped base wall 140, a tube bearing pedestal 142, and a detent pedestal 146. The base wall 140 is adapted for mounting the base assembly 44 to the vehicle in a well-known manner using generally conventional fasteners (not shown). The tube bearing pedestal 142 comprises a generally rectilinear-shaped perimeter wall extending generally orthogonally from the base wall 140 and comprising a tube cradle 144 having an end wall 148, and a pair of side walls 150, 152. The side wall 150 is provided with an arcuate surface 154, and the side wall 152 is provided with an arcuate surface 156 to form a cradle having a curvature complementary to the curvature of the pivot tube 66. The walls 148, 150, 152 and the detent pedestal 146 comprise a perimeter structure defining a well-like detent receptacle 164. The side walls 150, 152 are provided with a plurality of apertures 162 for receipt of fasteners therein.

The detent pedestal 146 is a generally rectilinear, solid, cube-like body extending orthogonally from the base wall 140, and adapted with apertures for attaching the mounting flange 88 thereto with suitable, preferably threaded, fasteners. The end wall 148 is adapted with apertures for attaching the mounting flange 90 thereto with suitable, preferably threaded, fasteners. The detent assembly 26 is attached to the tube bearing pedestal 142, and the detent pedestal 146 so that the bearing wall 84 is received in the detent receptacle 164 and the roller 106 extends away from the tube bearing pedestal 142. Alternatively, the detent assembly 26, the tube bearing pedestal 142, and the detent pedestal 146 can be adapted so that the support element 50 is integrated into the tube bearing pedestal 142 and the detent pedestal 146, and eliminated as a separate element, with the pivot element 52 pivotably attached to the detent pedestal 146, and the spring 54 received in the detent receptacle 164.

Referring now to FIGS. 10 and 11, the detent clamp 126 is a generally arcuate frame-like body comprising an arcuate wall 180 transitioning to a rearward flange 182 and a forward flange 186 in generally spaced-apart, coplanar juxtaposition. The flanges 182, 186 are provided with a plurality of mounting apertures 190 therethrough. The flanges 182, 186 are inclined relative to the arcuate wall 180. The detent clamp 126 is adapted to be attached to the tube bearing pedestal 142 by insertion of fasteners through the apertures 190 into the apertures 162 to provide a circular channel way defined by the arcuate surfaces 154, 156 and the arcuate wall 180. The channel way will be inclined relative to the base wall 140 to maintain the channelway in a generally vertical orientation when the base assembly 14 is attached to the vehicle.

Referring to FIG. 12, a detent liner 124 is a generally tube-like body comprising an arcuate wall 196 terminating in an upper arcuate band 198 and a lower arcuate band 200. The upper arcuate band 198 is separated longitudinally by an upper slot 202 to form a pair of circumferential band arms 220, 222. The lower arcuate band 200 is separated longitudinally by a lower slot 204 in collinear alignment with the upper slot 202 to form a pair of circumferential band arms 224, 226. The bands 198, 200 define a partially circumferential center opening 206. The slots 202, 204 enable the band arms 220-226 to flex independently. The detent liner 124 is preferably manufactured of a plastic, such as nylon or PET.

The detent assembly 26 is attached to the tube bearing pedestal 142 as previously described. The tube assembly 60 is then attached to the tube bearing pedestal 142 by the detent clamp 126 with the detent liner 124 circumscribing the pivot tube 66. The detailed liner 124 is positioned about the pivot tube 66 so that the indentations 210, 212 are accessible through the center opening 206. The indentations 210, 212 can then engage the roller 106 as the arm assembly 16 is pivoted. The indentations 210, 212 are positioned along the pivot tube 66 so that one indentation will engage the roller 106 when the arm assembly 16 is pivoted outwardly of the vehicle, as illustrated in FIG. 13, and the other indentation will engage the roller 106 when the arm assembly 16 is pivoted inwardly along the vehicle, as illustrated in FIG. 14. The roller 106 will travel outside the indentations 210, 212 if the arm assembly 16 is pivoted to an overtravel position, for example if the arm assembly 16 is pivoted toward the front of the vehicle, as illustrated in FIG. 15.

The mirror system 10 has been described as comprising a detent assembly 26 having a roller 106 adapted to contact the pivot tube 66 and seat in spaced indentations 210, 212 as the pivot tube 66 rotates relative to the detent assembly 26. Alternatively, the pin arms 120, 122 of the detent assembly 26 can be configured with an indentation extending between the arms 120, 122 and replacing the roller 106, and the pivot tube 66 can be provided with rollers, knurls, or other projections in place of the indentations 210, 212 for engagement with the indentation in the detent assembly 26. The roller 106 can also be substituted with a fixed member extending between the pin arms 120, 122 adapted to slidably engage the pivot tube 66 and the indentations 210, 212, preferably utilizing a low-friction material overlying the fixed member, the pivot 266, and the indentations to facilitate movement of the fixed member into and out of the indentations as the pivot tube rotates relative to the detent assembly.

Another embodiment of a rearview vehicle mirror system is shown in general by reference numeral 310 in FIGS. 16-23.

The mirror system 310 is typically used in larger-scale applications such as on heavy truck and tractor-trailer vehicles. The mirror system 310 comprises a base assembly 314, an arm assembly 316 and a reflective element assembly 318 as in the previous embodiment.

It will be understood that the detent assembly 26 employed in the mirror system 310 of the alternative embodiment shown in FIGS. 16-23 is the same as the detent assembly described with respect to FIGS. 1-15. As such, the structure, function and operation of the detent assembly 26 is not redescribed for purposes of brevity, but rather, the detent assembly 26 and its subparts and subcomponents are referred to with common reference numerals as those used in FIGS. 1-15 and the accompanying description herein.

Figure 16:
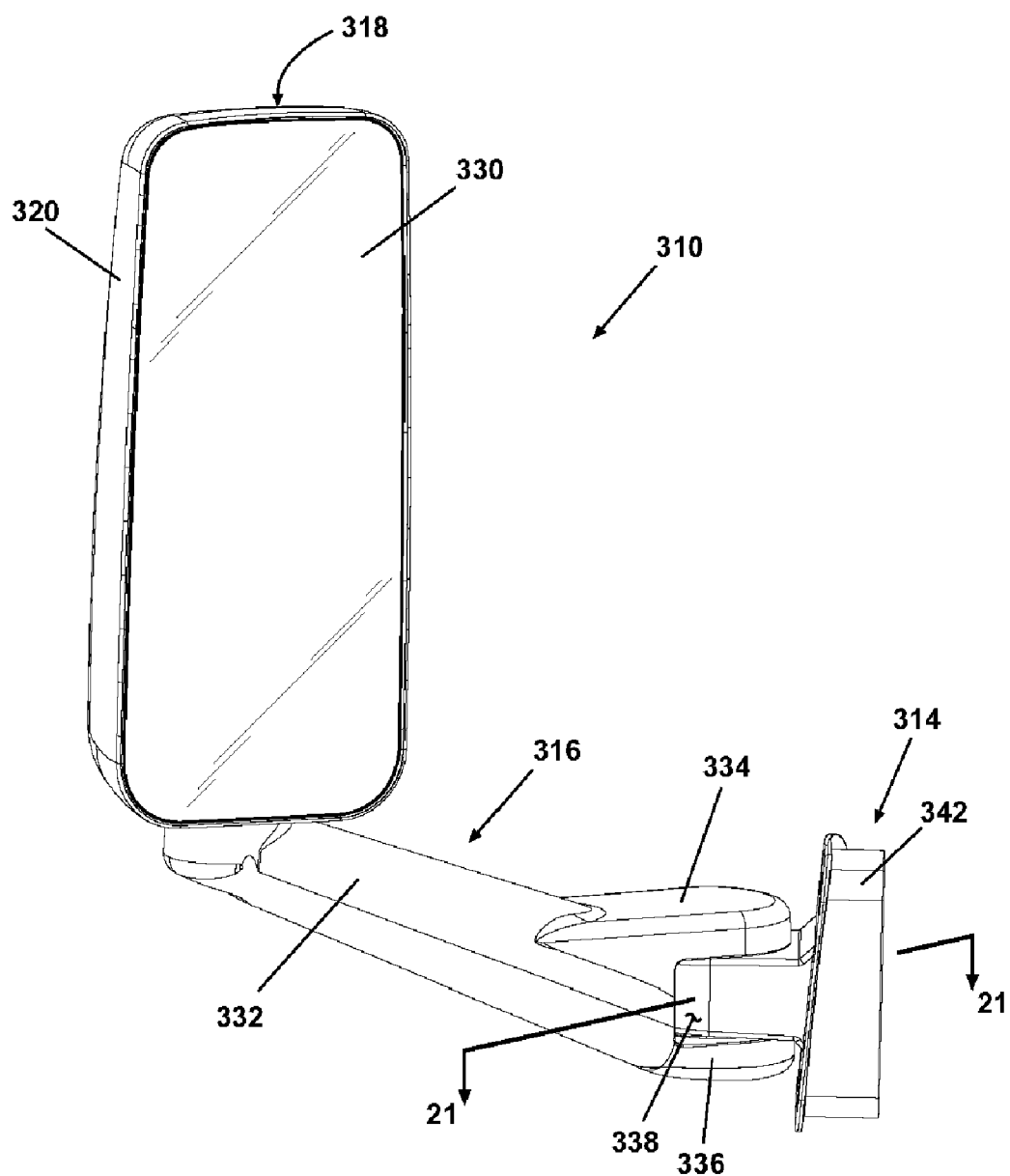
FIG. 16 is a perspective view of an alternative embodiment of a vehicle rearview mirror system according to the invention, incorporating a detent assembly as described with respect to the embodiment of FIGS. 1-15.
Figure 17:
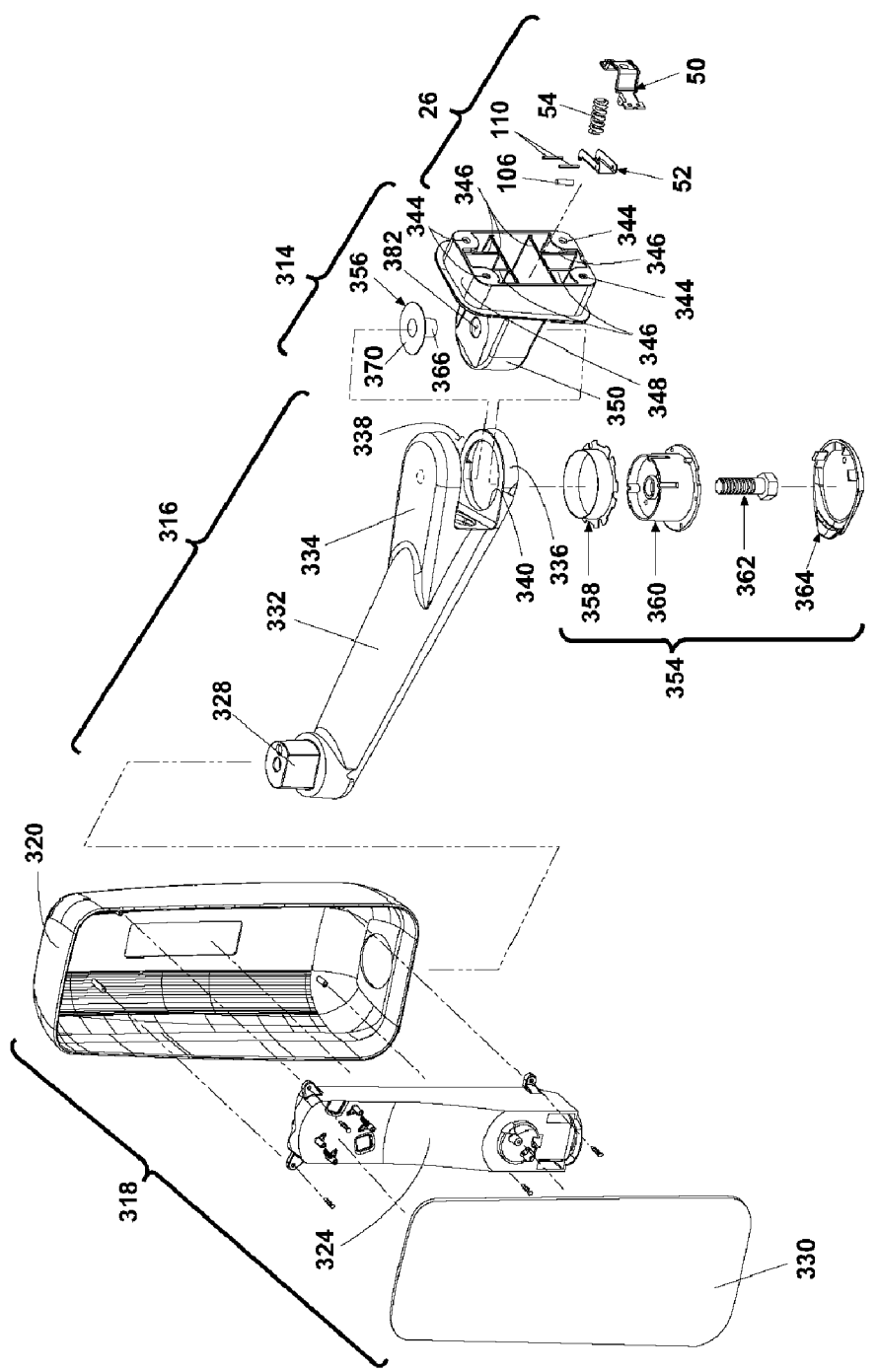
FIG. 17 is an exploded view of the rearview mirror system illustrated in FIG. 16.
Figure 17A:
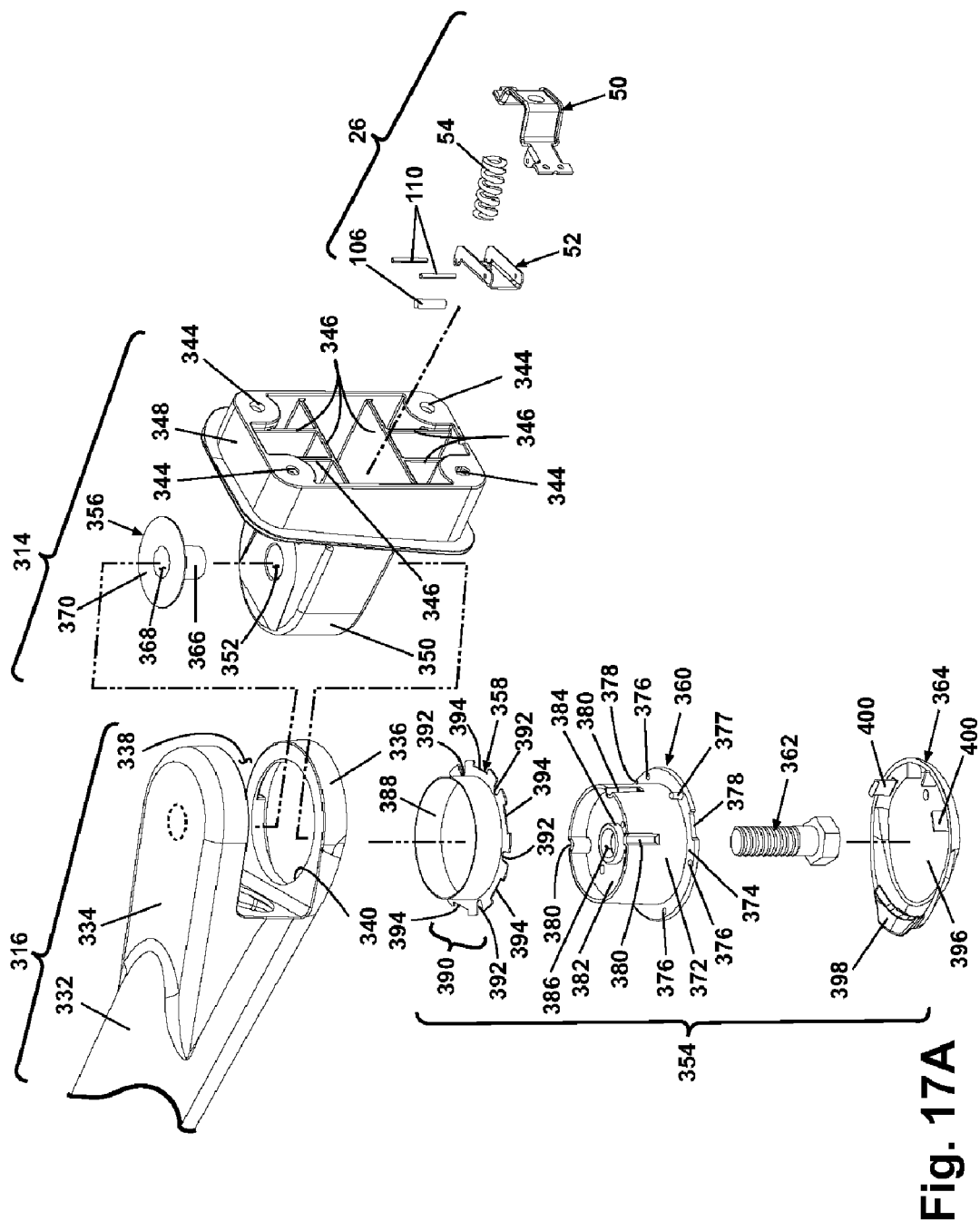
FIG. 17A is an enlarged, exploded view of a portion of FIG. 17 detailing components making up a pivot connection between the arm assembly and the base assembly which is adapted to receive the detent assembly.
Figure 18:
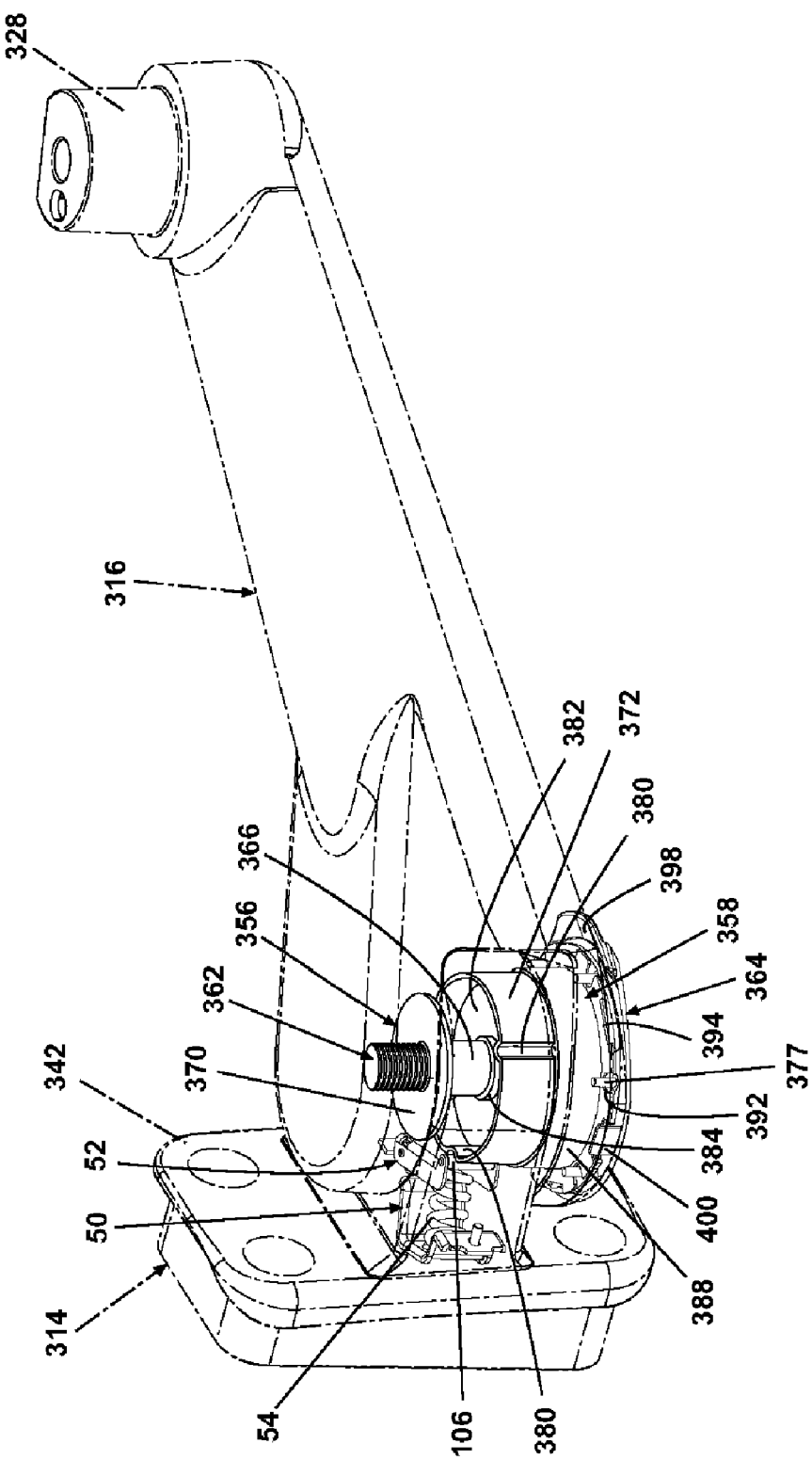
FIG. 18 is a perspective view of the rearview mirror system illustrated in FIGS. 16-17 with a mirror shell portion removed and an arm assembly and base assembly shown in phantom lines for clarity purposes and to illustrate the detent assembly located in a pivot connection between the arm assembly and the base assembly for positioning the arm assembly relative to the base assembly.
Figure 19:
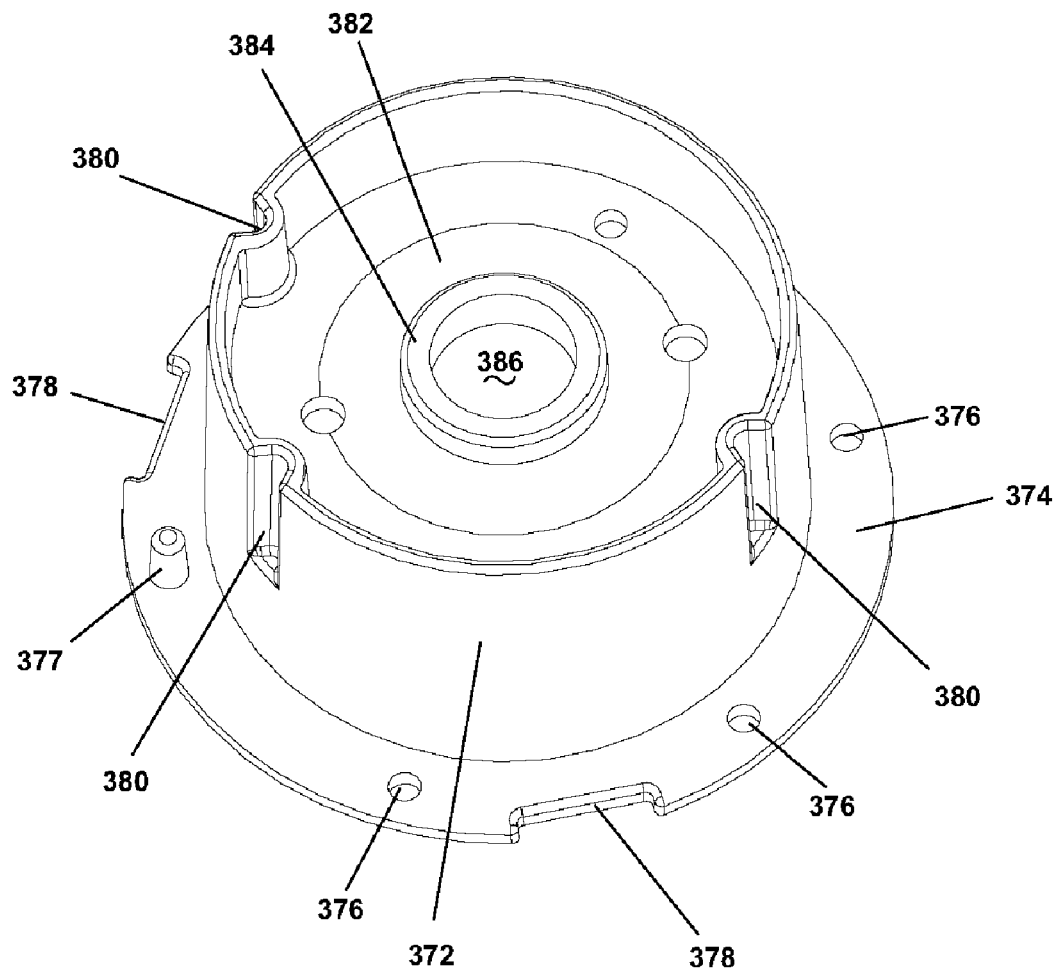
FIG. 19 is an enlarged, perspective view of a bearing pedestal of the arm assembly illustrated in FIG. 18.
Figure 20:
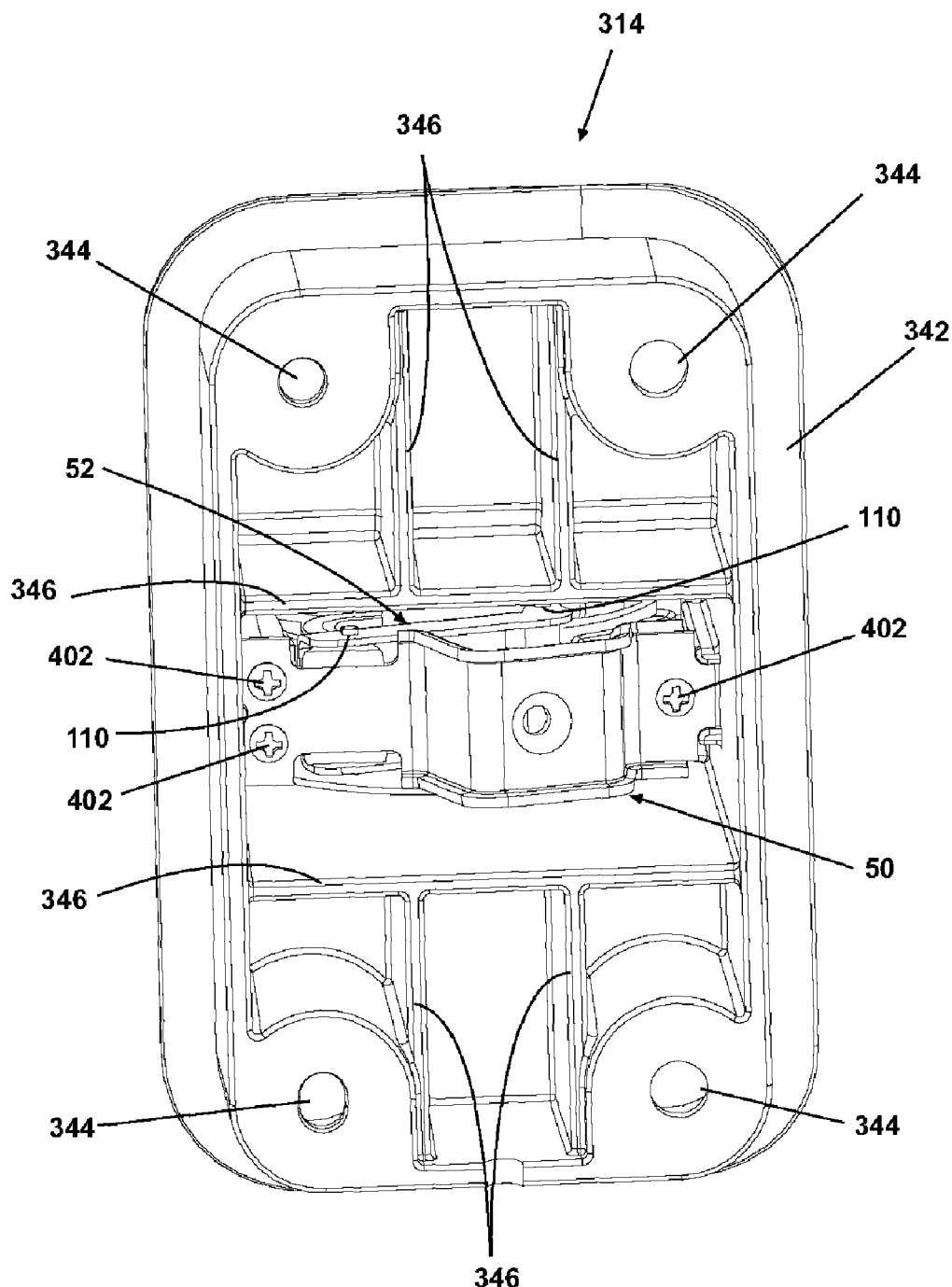
FIG. 20 is a side elevational view of the base assembly illustrated in FIGS. 16-18, illustrating in detail the mounting of a portion of the detent assembly thereto.

With reference to FIGS. 16 and 17, the mirror system 310 will now have its components described in greater detail.

The reflective element assembly 318 generally comprises a shell 320 and a reflective element 330. A tilt actuator bracket 324 is fastened to the shell 320 by appropriate fasteners such as those shown in FIG. 17 or by any fastener which would be apparent to one skilled in the art. The tilt actuator bracket 324 includes appropriate connections to effect movement of the reflective element 330 about at least one axis, and preferably two perpendicular axes, with respect to the shell 320.

The shell 320 also includes an opening 326 through a lower surface which, when the tilt actuator 324 is mounted within the shell 320, aligns with a socket (not shown) on the underside of the tilt actuator 324 for receipt of a protrusion 328 on a distal end of the arm assembly 316. The protrusion on the end of the arm assembly 316 is keyed to the interior of the tilt actuator 324 for non-rotation with respect thereto. An actuating mechanism (not shown), whether manually-actuated, electrical, or computer-controlled, can be passed from the interior of the vehicle, through the base assembly, along the arm assembly and into the mirror shell and be operatively interconnected to the tilt actuator 324. The tilt positional angle of the reflective element 330 can be thereby controlled by the operator from the interior of the vehicle.

The arm assembly 316 comprises an elongated body 332 having a distal end provided with the keyed protrusion 328 and a proximal end having an upper prong 334 and a lower prong 336. The upper and lower prongs 334 and 336 extend in angular fashion from the proximal end of the body 332 of the arm assembly 318 and preferably have terminal ends thereon which define an opening 338 therebetween. The opening 338 is preferably sized to receive a portion of the base assembly 316 and house a pivot connection in which the detent assembly 26 will make a positive engagement between the base assembly 316 and the arm assembly 318 as will be hereinafter described.

The underside of the upper prong 334 of the elongated body 332 of the arm assembly includes a threaded aperture (not shown). The underside of the upper prong 334 also includes a circular recess (not shown) generally coaxial with the threaded aperture.

The lower prong 336 of the elongated body 332 of the arm assembly includes an opening 340 that is generally coaxial with the threaded aperture and circular recess located on the underside of the upper prong 334 of the elongated body 332.

The base assembly 314 comprises a generally rectangular body 342 having several spaced mounting apertures 344 provided in a side elevational surface thereof which are each adapted to receive a fastener for mounting the base to a conventional location to a vehicular side panel adjacent to or integral with a window area on the vehicle entry door. It will be understood that the shape of the body 342 is not limiting on the scope of this invention and any desired shape for the body 342 of the base assembly 314 is contemplated without departing from the scope of this invention.

The body 342 of the base assembly 314 further comprises a series of optional strengthening ribs 346 provided on the same elevational surface as the mounting apertures 344. The body 342 can further have a peripheral flange 348 for aesthetically blending in with the vehicle styling on which the base assembly 314 is mounted.

An opposite elevational side of the body 342 of the base assembly 314 is provided with a mounting flange 350 which has a rounded distal surface so that the mounting flange 350 appears as a rectangular extension extending from the body 342 and having a generally semicircular outer surface. The mounting flange 350 has a generally circular opening 352 extending vertically through a central area thereof.

The components making up a pivot connection 354 between the arm assembly 316 and the base assembly 314 will now be described in greater detail. These components of the pivot connection 354 comprise: a top bearing 356, a pivot shaft 358, a pivot shaft bearing 360, an alignment pin 362, and a lower cover 364.

The top bearing 356 comprises a cylindrical shaft 366 having a coaxial opening 368 therethrough. An upper portion of the top bearing 356 includes a radially-extending disc 370 extending therefrom.

The pivot shaft 360 comprises a generally cylindrical body 372 having a perimeter wall and a base flange 374 extending from a lower surface thereof. The base flange 374 has several mounting apertures 376 located around the circumference thereof in generally spaced radial relationship to one another. A locator pin 377 extends upwardly from one of the radial spaced locations of the mounting apertures 376 and functions as a positioning member for the pivot shaft 360 relative to the pivot shaft bearing as will be hereinafter described. The base flange 374 also has a plurality of generally rectangular indentations 378 extending inwardly from the periphery of the base flange 374 and located around the circumference thereof in generally spaced radial relationship to one another.

A plurality of grooves 380 are formed in the perimeter wall of the cylindrical body 372 and correspond in radial position around the cylindrical body to unfolded (see FIG. 21), folded (see FIG. 22) and overtravel (see FIG. 23) positions of the arm assembly 316 relative to the base assembly 314.

An upper surface 382 of the cylindrical body 372 is recessed from an upper sidewall edge of the cylindrical body 372 and has a coaxial bearing surface 384 located therein. The coaxial bearing surface 384 defines the periphery of an alignment opening 386 which extends the vertical height of the cylindrical body 372.

The pivot shaft bearing 358 comprises a annular ring 388 preferably corresponding closely in inner diameter to the outer diameter of the cylindrical body 372 of the pivot shaft 360 and corresponding closely in vertical height to the distance between the lower surface of the grooves 380 and the upper surface of the base flange 374 of the cylindrical body 372 of the pivot shaft 360. The annular ring 388 includes a base flange 390 extending radially outwardly from a lower surface of the ring 388. The base flange 390 has several U-shaped openings 392 located around the circumference thereof in generally spaced radial relationship to one another whereby the opening extends inwardly from the periphery of the base flange 390. The base flange 390 also has a plurality of generally rectangular indentations 394 extending inwardly from the periphery of the base flange 390 and located around the circumference thereof in generally spaced radial relationship to one another.

The U-shaped openings 392 on the base flange 390 of the pivot shaft bearing 358 are in register with the mounting apertures 376 and the locator pin 377 on the base flange 374 of the pivot shaft 360. The indentations 394 on the base flange 390 of the pivot shaft bearing 358 are in register with the indentations 378 on the base flange 374 of the pivot shaft 360.

The alignment pin 362 can comprise any suitable member upon which the arm assembly 314 can pivot. By way of illustration of the invention and not by limitation on the invention, a threaded fastener, such as a bolt with suitable threads and a hexagonal head is shown in the figures relating to this embodiment of the invention.

The lower cover 364 comprises any member suitable for closing the lower surface of the opening 340 on the lower prong 336 of the arm assembly. The lower cover 364 shown in the drawings comprises a body 396 provided with a release tab 398 and a plurality of upwardly extending tabs 400, preferably having snap-fit teeth thereon.

The assembly of the components making up the pivot connection 354 and the assembly of the pivot connection 354 to the respective attachment points of the arm assembly 316 and to the base assembly 314 will now be described.

The shaft 366 of the top bearing 356 is inserted into the opening 352 of the pivot flange 350 of the base assembly 314. The pivot shaft bearing 358 is coaxially received atop the pivot shaft 360 so that the base flange 390 of the pivot shaft bearing 358 abuts the base flange 374 of the pivot shaft 360. The locator pin 377 on the pivot shaft 360 is received within one of the U-shaped openings 392 on the pivot shaft bearing 358 and the mounting apertures 376 on the pivot shaft 360 are aligned with one of the remaining U-shaped openings 392 on the pivot shaft bearing 358. The indentations 378 on the pivot shaft 360 are aligned with a corresponding one of the indentations 394 on the pivot shaft bearing 358. Several conventional fasteners, such as screws, are then mounted through the U-shaped openings 392 on the pivot shaft bearing 358 and the mounting apertures 376 on the pivot shaft 360 to secure the pivot shaft bearing 358 to the pivot shaft 360.

Preferably, the pivot shaft bearing 358 is made of a lower friction material than the base assembly 314 and/or the arm assembly 316 since the function of the pivot shaft bearing 358 is to reduce friction during pivoting of the arm assembly 316 relative to the base assembly 314. If the materials making up the base assembly 314, the arm assembly 316 and/or the components of the pivot connection 354 (other than the pivot shaft bearing 358) are made of sufficiently low-friction materials, then it will be understood that the pivot shaft bearing 358 is not needed and can be removed.

The mounting flange 350, with the top bearing 356 mounted thereon, on the base assembly 314 is passed into the opening 338 between the upper and lower prongs 334 and 336, respectively, of the arm assembly 314 so that the openings 368, 352 in the top bearing 356 and the mounting flange 350 align with the threaded aperture in the underside of the top prong 334 of the arm assembly 316. The subassembly of the pivot shaft 360 and the pivot shaft bearing 358 is passed into the opening 340 of the lower prong 336 of the arm assembly (from an initial position beneath the arm assembly 316), and into the interior of the mounting flange 350 so that the opening 386 of the bearing opening 384 on the pivot shaft 360 is aligned with the openings 352, 368 as well as with the threaded aperture on the underside of the upper prong 334.

The alignment pin 362, preferably with a threaded end thereon, is passed through the aligned openings and is fastened to the threaded aperture within the upper prong 334 of the arm assembly. The lower cover 364 is mounted to the base flanges 374, 390 of the pivot shaft 360 and the pivot shaft bearing 358, respectively, by interengaging the snap-fit teeth on the tabs 400 with the aligned indentations 378, 394 of the pivot shaft 360 and the pivot shaft bearing 358, respectively.

The detent assembly 26 is mounted to the body 342 of the base assembly 314 by fasteners 402. Once so mounted, the roller 106 thereof can roll against the elevational surface of the cylindrical body 372 of the pivot shaft 360 and engage within a corresponding groove 380 thereon depending upon the rotational position of the arm assembly 316 relative to the base assembly 314. The spring 54 urges the roller 106 into the corresponding groove 380 when a particular groove 380 is aligned with the roller 106 due to rotation of the arm assembly 316 relative to the base assembly 314.

The pivot shaft 360, the pivot shaft bearing 358 and the alignment pin 362 therefore are fixedly mounted with, and rotate with, the arm assembly 316. The top bearing 356 and mounting flange 350 and rotationally fixed with respect to the base assembly 314.

Figure 21:
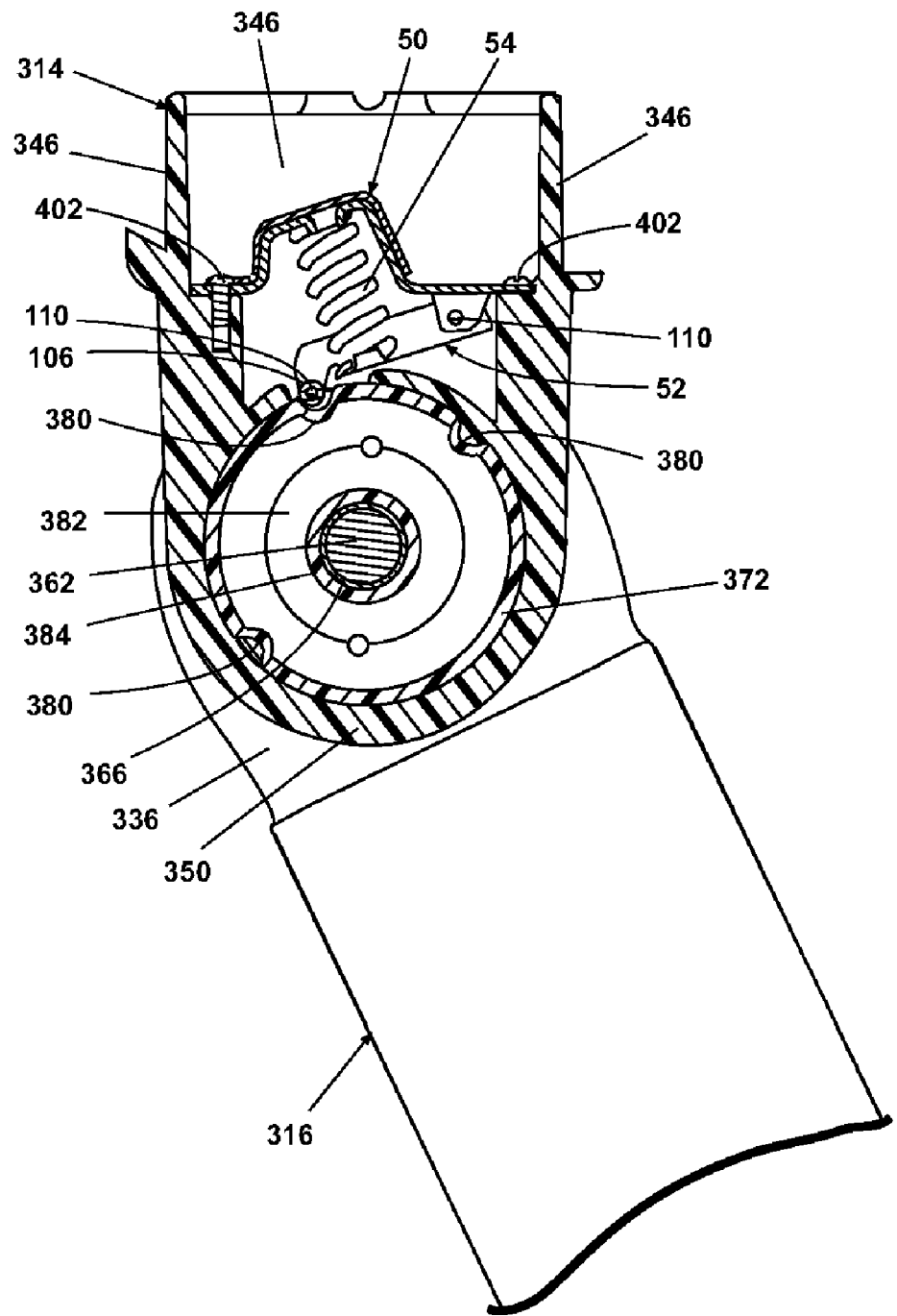
FIG. 21 is a sectional view of the pivot connection and the detent assembly taken along view line 20-20 of FIG. 16 illustrating the detent assembly with the mirror system in a fully unfolded position.
Figure 22:
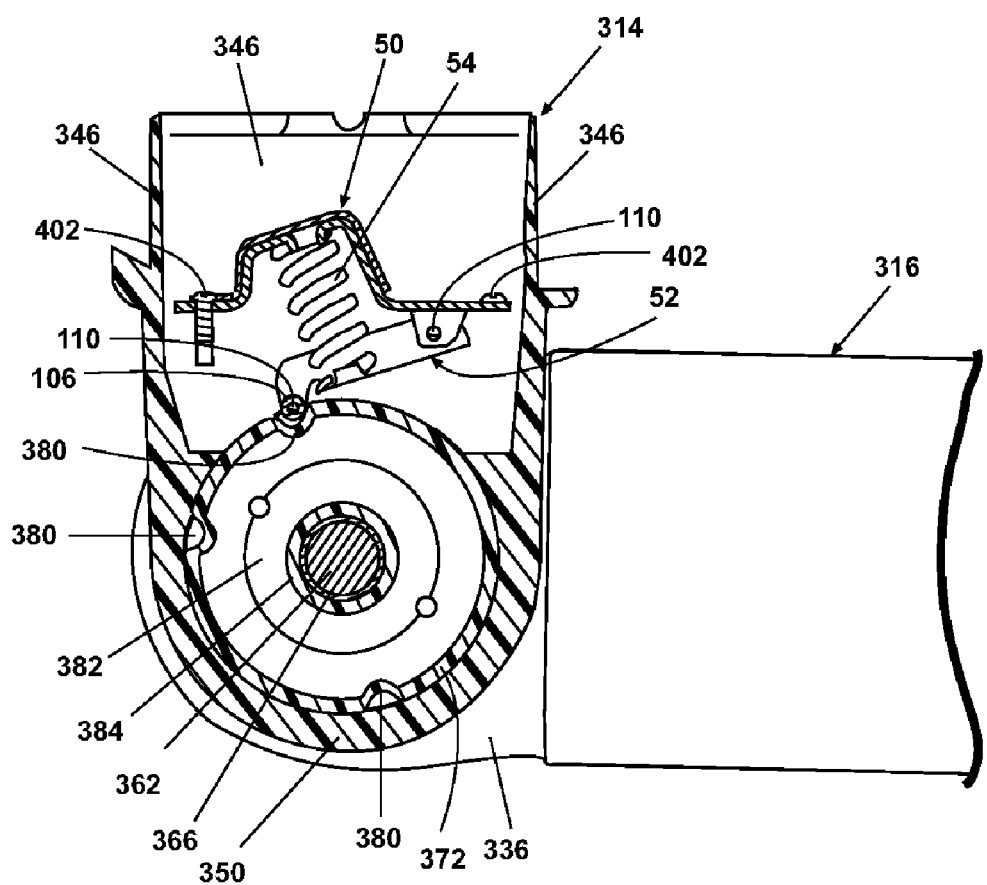
FIG. 22 is a sectional view of the pivot connection and the detent assembly taken along view line 20-20 of FIG. 16 illustrating the detent assembly with the mirror system in a fully folded position.
Figure 23:
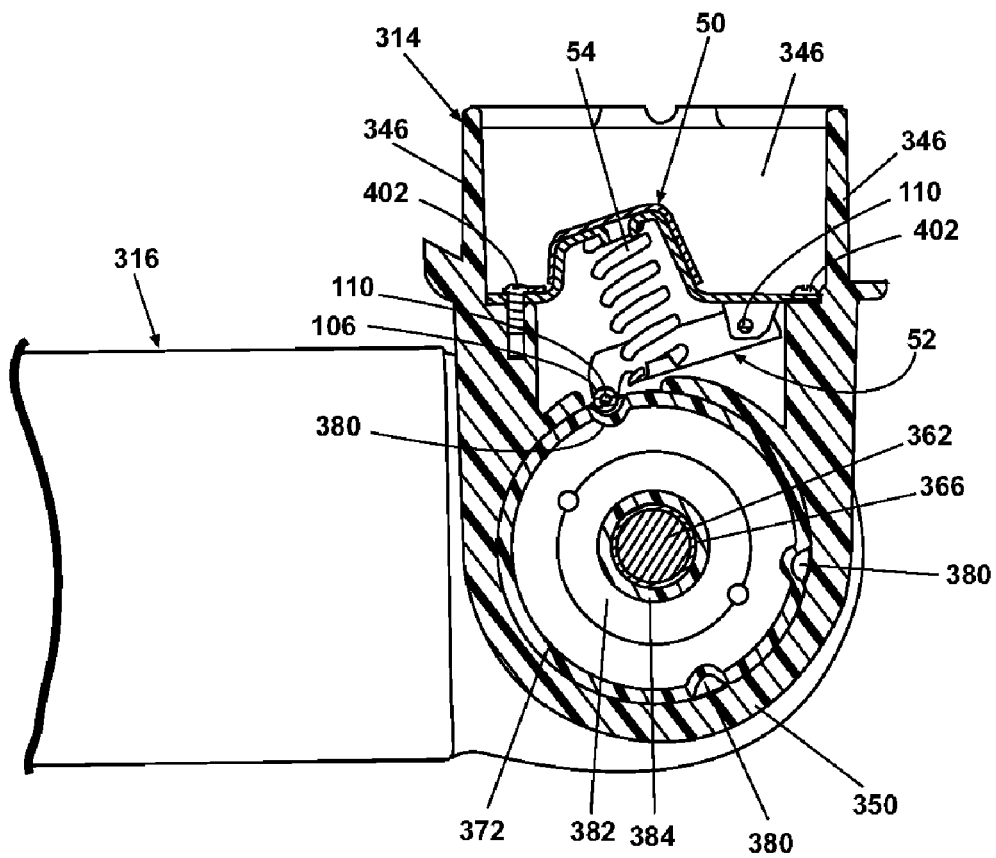
FIG. 23 is a sectional view of the pivot connection and the detent assembly taken along view line 20-20 of FIG. 16 illustrating the detent assembly with the mirror system in an overtravel position.

During use, the arm assembly 314 is in an initial position, such as the unfolded position shown in FIG. 21. FIGS. 21, 22 and 23 are sectional views of the pivot connection and the detent assembly taken along view line 20-20 of FIG. 16 illustrating the detent assembly with the mirror system in a fully unfolded position, a fully folded position, and an overtravel position, respectively.

Rotation of the arm assembly 314 with respect to the base assembly 316 causes the roller 106 to be disengaged from the groove 380 and to roll against the periphery of cylindrical body 372 of the pivot shaft 360. Location of the arm assembly 316 into the fully folded position of FIG. 22, i.e., where the arm assembly 316 and reflective element assembly 318 are located adjacent the vehicle will cause the roller 106 to be engaged positively within the next successive groove 380 as shown. Reverse over-pivoting (i.e., overtravel) of the arm assembly 316 as shown in FIG. 22, i.e., where the arm assembly 316 and reflective element assembly 318 are pivoted away from the vehicle causes the roller 106 to be engaged positively within the outer successive groove 380 as shown.

The detent assembly 26 can also be utilized for a mirror having a reflective element assembly that can pivot between an inboard, horizontal configuration and an outboard, vertical configuration, as described in U.S. Provisional Patent Application Ser. No. 60/522,175, filed Aug. 25, 2004, which is incorporated herein by reference.

The herein-described vehicle mirror system has a significantly stronger pivot connection than the prior art mirror assemblies. The use of the tube cradle to support the tube assembly increases the strength of the cantilevered arm assembly by providing support at two spaced-apart bearing locations on the pivot tube. The detent assembly enables the reflective element assembly to be pivoted about the pivot connection without affecting the strength of the pivot connection, and can be interchangeably utilized to control the movement and positioning of selected moving parts in the mirror system. The use of a side-acting detent assembly also eliminates the need for a helical spring urging the arm assembly against the base, which is required in a conventional detent configuration. Assembly is also facilitated in that the arm assembly can be attached to the base without working against a spring force. It is anticipated that the arm assembly will be attached to the base prior to the incorporation of the detent assembly into the pivot assembly.

Finally, the use of a detent assembly comprising a roller detent makes the powerfold functionality easier to implement. The use of a roller results in less friction between the pivoting arm assembly and the stationary base compared to the prior art detent configuration, which relies on a sliding detent configuration.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

What is claimed is:

1. A vehicular exterior mirror assembly, said exterior mirror assembly comprising:
    a base assembly adapted for fixed attachment to an exterior portion of the vehicle;
    a reflective element assembly pivotally attached to the base assembly and supported thereby;
    a pivot member interposed between the base assembly and the reflective element assembly defining an axis of rotation between the base assembly and the reflective element assembly; and
    a detent assembly mounted to one of the base assembly and the reflective element assembly, having a detent assembly member positioned to exert a force against the pivot member normal but not parallel to the axis of rotation;
    wherein one of the pivot member and the detent assembly member comprises at least one indentation and the other of the pivot member and the detent assembly member comprises a bearing element;
    whereby the reflective element assembly can be pivoted relative to the base assembly against the force exerted by the detent assembly member and, when the bearing element engages with the at least one indentation, the reflective element assembly will be held in a position defined by the at least one indentation relative to the base assembly by said force.

2. A vehicular exterior mirror assembly according to claim 1 and further comprising a biasing member coupled with the detent assembly member for exerting said force.

3. A vehicular exterior mirror assembly according to claim 1 wherein the bearing element comprises a roller.

4. A vehicular exterior mirror assembly according to claim 3 wherein the detent assembly is mounted to the base assembly.

5. A vehicular exterior mirror assembly according to claim 1 wherein the detent assembly is mounted to the base assembly.

6. A vehicular exterior mirror assembly according to claim 1 wherein the pivot member comprises a perimeter wall that is cylindrical.

7. A vehicular exterior mirror assembly according to claim 1 wherein the pivot member comprises the at least one indentation.

8. A vehicular exterior mirror assembly according to claim 7 wherein the at least one indentation comprises at least three indentations.

9. A vehicular exterior mirror assembly according to claim 7 wherein the at least one indentation comprises at least two indentations and wherein one of said two indentations defines a position wherein the reflective element assembly extends away from the exterior portion of the vehicle.

10. A vehicular exterior mirror assembly according to claim 7 wherein the at least one indentation comprises at least two indentations and wherein one of said two indentations defines a position wherein the reflective element assembly is adjacent the exterior portion of the vehicle.

11. A vehicular exterior mirror assembly according to claim 1 wherein the vehicular exterior mirror assembly comprises an extendable vehicular exterior mirror assembly.

12. A vehicular exterior mirror assembly according to claim 11 wherein said extendable vehicular exterior mirror assembly comprises a powered extendable vehicular exterior mirror assembly.

13. A vehicular exterior mirror assembly, said exterior mirror assembly comprising:
    a base assembly adapted for fixed attachment to an exterior portion of the vehicle;
    a reflective element assembly pivotally attached to the base assembly and supported thereby;
    a pivot member interposed between the base assembly and the reflective element assembly defining an axis of rotation between the base assembly and the reflective element assembly; and
    a detent assembly mounted to one of the base assembly and the reflective element assembly, having a detent assembly member positioned to exert a force against the pivot member normal but not parallel to the axis of rotation;
    wherein one of the pivot member and the detent assembly member comprises at least one indentation and the other of the pivot member and the detent assembly member comprises a bearing element;
    a biasing member coupled with the detent assembly member for exerting said force;
    wherein said bearing element comprises a roller; and
    whereby the reflective element assembly can be pivoted relative to the base assembly against the force exerted by the detent assembly member and, when the bearing element engages with the at least one indentation, the reflective element assembly will be held in a position defined by the at least one indentation relative to the base assembly by said force.

14. A vehicular exterior mirror assembly, said exterior mirror assembly comprising:
    a base assembly adapted for fixed attachment to an exterior portion of the vehicle;
    a reflective element assembly pivotally attached to the base assembly and supported thereby;
    a pivot member interposed between the base assembly and the reflective element assembly defining an axis of rotation between the base assembly and the reflective element assembly; and
    a detent assembly mounted to one of the base assembly and the reflective element assembly, having a detent assembly member positioned to exert a force against the pivot member normal but not parallel to the axis of rotation;
    wherein one of the pivot member and the detent assembly member comprises at least two indentations and the other of the pivot member and the detent assembly member comprises a bearing element;
    a biasing member coupled with the detent assembly member for exerting said force;
    wherein said bearing element comprises a roller
    whereby the reflective element assembly can be pivoted relative to the base assembly against the force exerted by the detent assembly member and, when the bearing element engages with one of the at least two indentations, the reflective element assembly will be held in a position defined by the one of the at least two indentations relative to the base assembly by said force.

15. A vehicular exterior mirror assembly according to claim 14 wherein one of said two indentations defines a position wherein the reflective element assembly extends away from the exterior portion of the vehicle.

16. A vehicular exterior mirror assembly according to claim 15 wherein the other of said two indentations defines a position wherein the reflective element assembly is adjacent the exterior portion of the vehicle.

17. A vehicular exterior mirror assembly according to claim 14 wherein the vehicular exterior mirror assembly comprises an extendable vehicular exterior mirror assembly.

18. A vehicular exterior mirror assembly according to claim 17 wherein said extendable vehicular exterior mirror assembly comprises a powered extendable vehicular exterior mirror assembly.

19. A vehicular exterior mirror assembly according to claim 14 wherein the pivot member comprises a perimeter wall that is cylindrical.

* * * * *